May 22, 1956 — T. L. EVANS — 2,746,767
FRONT SEAT CRASH BAR
Filed April 9, 1954 — 2 Sheets-Sheet 1

INVENTOR
T. L. Evans
BY John N. Randolph
ATTORNEY

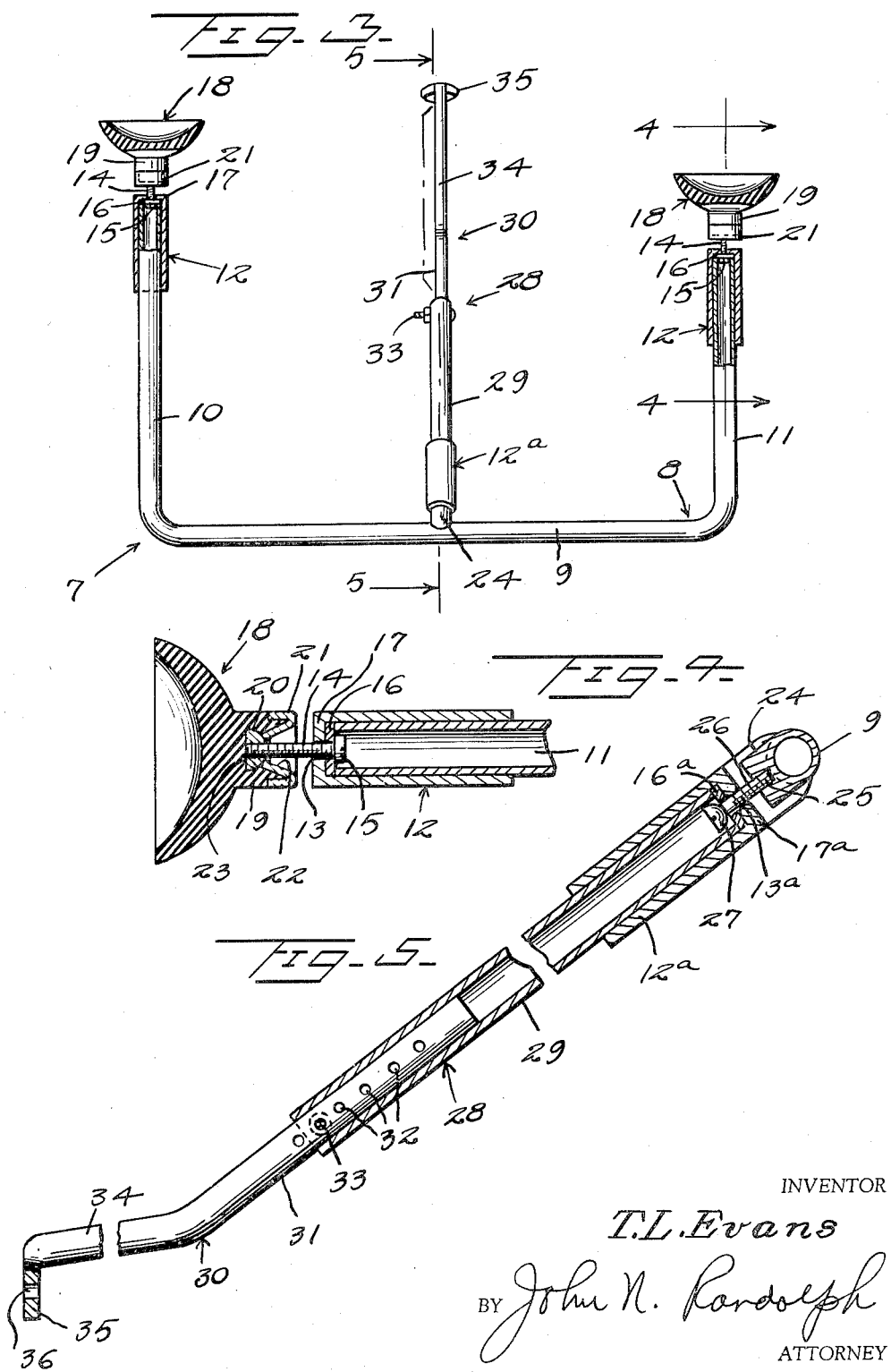

2,746,767
FRONT SEAT CRASH BAR

Trevenor Leon Evans, Marietta, Okla.

Application April 9, 1954, Serial No. 422,103

7 Claims. (Cl. 280—150)

This invention relates to a crash bar or protector of extremely simple construction capable of being mounted in a motor vehicle to provide a bumper or guard for the front seat passengers.

It is a recognized fact that the most serious injuries and fatalities of motor vehicle riders occur to passengers riding in the front seat of motor vehicles as such persons have nothing to protect them from being thrown forwardly against the instrument panel or through the windshield. The back of the front seat affords at least some protection to the rear seat passengers while the vehicle driver has the protection of the steering wheel.

Accordingly, it is an aim of the present invention to provide a protector or guard for the front seat passengers, of extremely simple construction which may be readily mounted in front of and above the right side of the front seat of a motor vehicle, which will protect the front seat passengers from being thrown forward against the instrument panel or through the windshield in the event of a sudden stop or collision, and which may be grasped to prevent said passenger from being thrown out of the vehicle should a defectively latched door open while the vehicle is turning sharply to the left.

Another object of the invention is to provide such a guard or protector which may be very quickly and easily mounted and which due to its unique construction is universally adapted to fit substantially all makes of motor vehicles.

Various other objects and advantages of the invention will hereinafter become more fully apparent from the following description of the drawings, illustrating a presently preferred embodiment thereof, and wherein.

Figure 3 is an enlarged top plan view of the crash bar, partly in section, shown removed from the vehicle, and Figures 4 and 5 are enlarged sectional views taken substantially along planes as indicated by the lines 4—4 and 5—5, respectively, of Figure 3.

Figure 2:
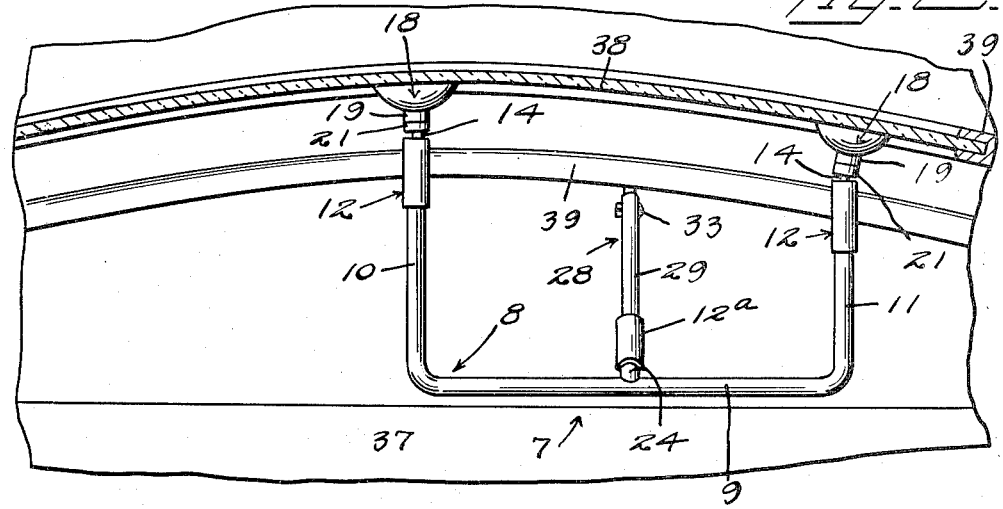
Figure 2 is a sectional view taken substantially along a plane as indicated by the line 2—2 of Figure 1 and showing the crash bar in top plan.

Referring more specifically to the drawings, the improved crash bar or protector in its entirety and comprising the invention is designated generally 7 and includes a substantially U-shaped member 8 including an intermediate portion 9 and end portions 10 and 11 which project from the ends of the intermediate portion 9 in the same direction. The end portion or arm 10, as seen in Figure 2, is longer than the other end portion or arm 11. The intermediate portion 9 constitutes a bumper and handhold, as will hereinafter be described. The U-shaped member 8 is preferably formed of a strong relatively lightweight metal and is preferably of tubular construction.

Corresponding connector sockets or couplers 12 are mounted on the distal ends of the arms 10 and 11. As best seen in Figure 4, each socket 12 has an outer end wall provided with a restricted opening 13 through which a shank of a headed bolt or screw 14 extends. The head 15 of the bolt or screw is disposed within the socket 12 and a washer 16 is preferably mounted on the screw or bolt shank between its head 14 and the end wall 17 of the socket, in which the opening 13 is formed.

The bolts or screws 14 form connecting means for connecting the sockets 12 to suction cups 18 which are preferably formed of rubber and each of which has a shank 19 projecting from its convex side and in which is embedded a nut 20. The nut 20 is preferably hemispherical in shape and may be retained in the shank 19 by a metal grommet or collar 21 which is molded to the outer end of the shank 19 and against an inner part of which the convex side of the nut 20 bears. The collar or grommet 21 defines an opening 22 to loosely accommodate the shank of the screw or bolt 14 and with which a threaded bore 23 of the nut registers. The bolt or screw shank is threaded into the nut 20 for connecting the suction cup to the socket 12 and it will be readily apparent that the nut 20 can have a limited turning movement in the rubber shank 19 enabling the suction cup 18 to be rocked relatively to the socket 12 and the bolt or screw 14. The bore or opening 22 of the ferrule 21 is flared outwardly to accommodate rocking movement of the ferrule relatively to the bolt or screw. It will be apparent that each suction cup 18 is thus assembled to its socket 12, as clearly illustrated in Figure 4. Additionally, the collars or ferrules 21 are spaced from the socket end walls 17 so as not to prevent rocking movement of the suction cups relatively to the sockets. After the suction cups and sockets have thus been assembled, the sockets are applied to the distal ends of the arms 10 and 11 and are secured thereto in any suitable manner as by a bonding medium, not shown.

The guard portion 9, intermediate of its ends, is provided with a boss 24 which extends downwardly therefrom at an angle relatively to the plane of the arms 10 and 11 and which is provided with a threaded outwardly opening recess 25, as seen in Figure 5. A socket 12a, corresponding to the sockets 12, is connected to the boss 24 by a headed screw or bolt 26 which extends loosely through an opening 13a in the end wall 17a of the socket 12 and which threadedly engages the recess 25 of the boss 24. A washer 16a is disposed in the socket 12a between its end wall 17a and the head 27 of the bolt or screw 26. The bolt or screw 26 connects the socket 12a to the boss 24 so that the end wall 17a thereof is spaced from the boss.

The socket 12a connects the upper end of a brace, designated generally 28 to the boss 24 and, accordingly, to the intermediate portion of the guard element 9. Said brace 28 includes an upper tubular section 29 having an upper end which is secured in the socket 12a, in any suitable manner as by a bonding medium, not shown. The brace 28 also includes a lower rod section 30 having a relatively long straight upper or inner portion 31 which slidably fits in the other lower end of the tubular section 29 and which is provided with a plurality of spaced openings 32 which extend diametrically therethrough. A bolt shank of a nut and bolt fastening 33 extends through diametrically aligned openings, not shown, in the lower portion of the tubular section 29 and through a selected one of the openings 32 for securing the brace sections 29 and 30 together and with the section 30 in different extended positions relatively to the section 29. The brace section 30 has a portion 34 forming an extension of the lower end of the portion 31 and which is disposed at an angle to the portion 31. The rod portion 34 at its outer end has a downwardly extending flat terminal portion 35 provided with an opening 36, the axis of which is disposed substantially parallel to the axis of the rod portion 34.

The socket members 12 and 12a are preferably formed of hard rubber and may correspond or substantially correspond to conventional hard rubber bicycle handle bar handgrips. Thus, the fastenings 14 and 26 will possess a limited rocking movement on the outer ends of the sockets 12 and 12a, respectively.

Figure 1:
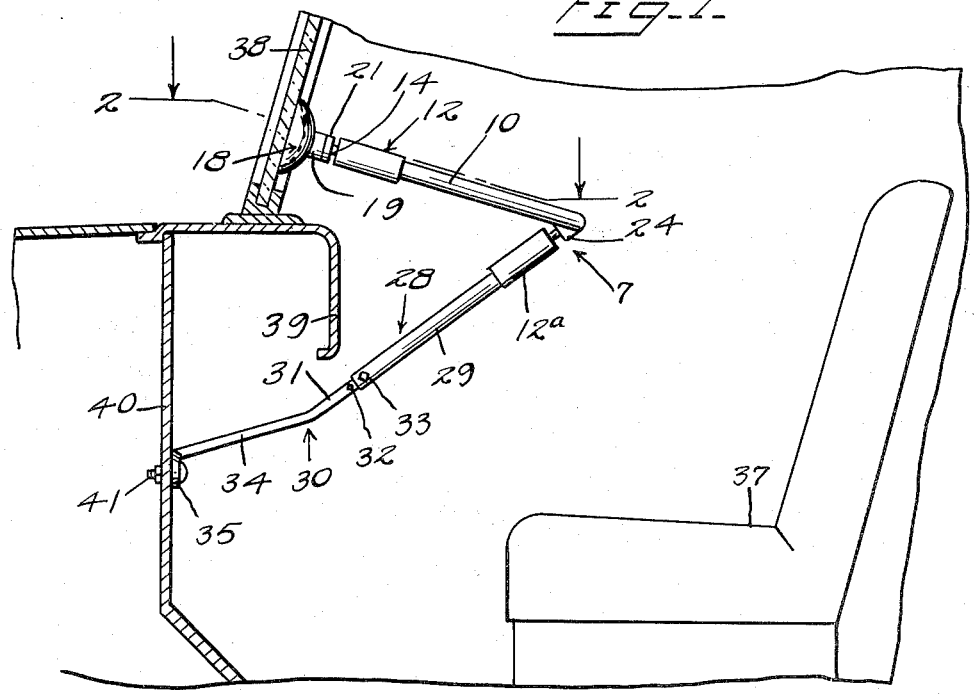
Figure 1 is a side elevational view of the crash bar shown in an applied position.

From the foregoing it will be readily apparent that the suction cups 18 may be secured by suction in a conventional manner to the inner side of a motor vehicle windshield in front of the right-hand side of the front seat 37 of the vehicle. A windshield 38 of conventional shape is partially illustrated in Figures 1 and 2 having the usual curvature horizontally, so that the end portions thereof are disposed rearwardly of the intermediate portion, as seen in Figure 2. For this reason, the arm 11 is made shorter than the arm 10 to properly position the suction cup 18, carried thereby, to engage the windshield 38 adjacent its right corner post or end 39. The longer arm 10 positions the suction cup 18 carried thereby in a more forward position to be secured to the windshield 38 near its longitudinal center. Both suction cups 18 are secured to the windshield 38 adjacent its bottom edge and the U-shaped member 8 extends rearwardly and slightly downwardly therefrom. The ability of the suction cups 18 to rock relatively to the socket 12 and arms 10 and 11, as previously described, enables said suction cups to be properly positioned at angles to one another in flush engagement with portions of the windshield 38 which are angularly disposed relatively to one another. The brace 28 extends downwardly and forwardly from the boss 24, as illustrated in Figure 1, passing under the bottom edge of the instrument panel 39 and is extended to a proper length so that its lower end portion 35 may engage against the rear side of the fire wall 40 of the vehicle which separates the engine compartment from the passenger compartment. The available rocking movement of the brace 28 relatively to the U-shaped member 8, afforded by the limited flexibility of the socket end 17a and the shape of the bolt head 27, enables the brace 28 to be swung until its end 35 will abut flush against the fire wall 40. Vertical rocking movement of the U-shaped member 8, relatively to the suction cup 18 will additionally assist in thus positioning the brace end 35. The brace end 35 is secured properly positioned to the fire wall 40 by a nut and bolt fastening 41 which extends through the opening 36 and through a hole drilled in the fire wall 40 in a proper position to register with the opening 36, and which constitutes the only modification made in the vehicle.

With the crash bar 7 in an applied position as illustrated in Figures 1 and 2, the U-shaped member 8 is inclined inwardly and downwardly from the windshield 38 so that the bumper or guard portion 9 thereof will be disposed at a convenient level above the forward edge of the front seat 37 in front of and adjacent the front seat passenger or passengers. The brace 28 extends downwardly from the guard portion 9 under the bottom edge of the instrument panel 39 and is disposed sufficiently therebeneath so as not to interfere with the instruments, wiring, glove compartment, radio and other parts, not shown, located between the instrument panel and fire wall.

Should the vehicle equipped with the crash bar or protector 7 be compelled to stop suddenly or have a collision involving the front end of said vehicle striking another object resulting in a sudden stop, the front seat passenger or passengers will be prevented from being thrown against the instrument panel 39 or against or through the windshield 38 by the guard or protector portion 9. Ordinarily, the passenger or passengers will have an opportunity to grab the portion 9 and use the protector 7 as a brace to prevent from being thrown forward.

The protector portion 9 will also provide a handhold which may be grasped by a front seat passenger to prevent being thrown toward the top of the car in the event of overturning of the vehicle or to prevent being thrown through an open door of the vehicle in making a sharp turn to the left and where a defectively latched door releases.

It will also be apparent that the adjustability of the suction cup members 18 relatively to the arms 10 and 11 will enable said suction cup members to be readily positioned at various angles to one another to engage windshields of different shapes which, in combination with the fact that the brace 28 is extensible and angularly adjustable, provides a crash bar protector universally adaptable for application to substantially all motor vehicles, including passenger cars and trucks. The brace 28 is located sufficiently above and away from the front seat 27 so as not to obstruct freedom of movement of the legs of the front seat passenger or passengers.

Various modifications and changes are contemplated and may obviously be resorted to, without departing from the spirit or scope of the invention as hereinafter defined by the appended claims.

I claim as my invention:

1. A vehicle passenger protector of the character described comprising a substantially rigid U-shaped member including an intermediate guard portion and arms extending in substantially the same direction from the ends of said guard portion, a pair of suction cups adapted to be detachably secured to horizontally spaced portions of the inner side of a windshield, means forming a limited universal connection between said suction cups and the free ends of said arms, said U-shaped member extending rearwardly with respect to the windshield from said suction cups, said arms being of a length to position said guard portion substantially above the forward part of the front vehicle seat, a brace having one end connected to said guard portion substantially midway between said arms and extending from the guard portion at an angle to the arms, and means adapted to secure the opposite end of said brace to the vehicle fire wall, said brace being adapted to extend below the bottom edge of the instrument panel and cooperating with the suction cups in supporting said U-shaped member.

2. A vehicle passenger protector device as in claim 1, and means forming a limited universal connection between an upper end of said brace and said guard portion.

3. A vehicle protector device as in claim 2, said brace being formed of extensible sections, means securing said sections in different extended positions, and said brace including a lower portion disposed at an angle to the upper portion thereof, said lower portion of the brace being disposed at an angle to the arms less than the angle formed by the arms and the upper portion of the brace.

4. A vehicle passenger protector as in claim 1, said arms being of different lengths, the longer one of the arms being connected to a suction cup adapted to be secured to the intermediate portion of the windshield and the other shorter arm being connected to a suction cup adapted to be secured to a right-hand end of the windshield.

5. A vehicle passenger protector device as in claim 1, said means connecting the arms to the suction cups including studs swingably connected to and extending from the forward free ends of said arms, and threaded means mounted in said suction cups and threadedly engaging the studs.

6. A vehicle passenger protector device as in claim 5, said means mounted in the suction cups and connected to said studs having a limited universal rocking movement relatively to the suction cups.

7. A vehicle passenger protector device comprising a substantially U-shaped rigid member, suction cups swingably connected to the ends of said U-shaped member and adapted to be detachably secured to the inner side of a vehicle windshield at longitudinally spaced points relative to the windshield for positioning said U-shaped member behind the windshield, a brace having one end connected to an intermediate portion of said U-shaped member and an opposite end adapted to be secured to a fire wall of the vehicle, said brace cooperating with the suction cups for supporting the intermediate portion of the U-shaped member above a portion of the front seat of the vehicle and in a position to form a front seat passenger guard member.

References Cited in the file of this patent

UNITED STATES PATENTS

| | | |
|---|---|---|
| 1,619,697 | Brown | Mar. 1, 1927 |
| 2,146,859 | Seklehner | Feb. 14, 1939 |
| 2,650,870 | Carpenter | Sept. 1, 1953 |

FOREIGN PATENTS

| | | |
|---|---|---|
| 897,053 | Germany | Nov. 16, 1953 |
| 318,339 | Great Britain | Sept. 5, 1929 |